United States Patent [19]

Asanuma et al.

[11] Patent Number: 5,334,684
[45] Date of Patent: * Aug. 2, 1994

[54] α-OLEFIN-ALKENYLSILANE COPOLYMER AND METHOD FOR PREPARING SAME

[75] Inventors: Tadashi Asanuma; Kaoru Kawanishi, both of Takaishi, Japan

[73] Assignee: Mitsui Toatsu Chemicals, Incorporated, Tokyo, Japan

[*] Notice: The portion of the term of this patent subsequent to Jul. 6, 2010 has been disclaimed.

[21] Appl. No.: 894,475

[22] Filed: Jun. 5, 1992

Related U.S. Application Data

[63] Continuation of Ser. No. 616,933, Nov. 21, 1990, abandoned.

[30] Foreign Application Priority Data

| | | | |
|---|---|---|---|
| Nov. 28, 1989 | [JP] | Japan | 1-306402 |
| Nov. 29, 1989 | [JP] | Japan | 1-307644 |
| Dec. 18, 1989 | [JP] | Japan | 1-326169 |

[51] Int. Cl.$^5$ .................... C08F 230/08; C08F 4/642
[52] U.S. Cl. ...................... 526/279; 526/160
[58] Field of Search .................... 526/160, 279

[56] References Cited

U.S. PATENT DOCUMENTS

| | | |
|---|---|---|
| 3,125,554 | 3/1964 | Cooper et al. . |
| 3,223,686 | 12/1965 | Natta .................. 526/279 X |
| 3,240,768 | 3/1966 | Guenther ............. 526/279 X |
| 3,258,455 | 6/1966 | Natta .................. 526/351 X |
| 3,644,306 | 2/1972 | Longi ................... 526/279 |
| 4,892,851 | 1/1990 | Ewen ................... 502/104 |
| 5,225,507 | 7/1993 | Asanuma et al. ..... 526/279 |

FOREIGN PATENT DOCUMENTS

| | | |
|---|---|---|
| 0321258 | 6/1989 | European Pat. Off. . |
| 0363990 | 4/1990 | European Pat. Off. . |
| 0222310 | 1/1990 | Japan . |
| 1415194 | 11/1975 | United Kingdom . |

OTHER PUBLICATIONS

J. A. Ewen et al. (1988) J. Am. Chem. Soc. 110, 6255-6256.
W. Kaminsky et al. (1985) Angew. Chem. Int. Ed. Engl. 24, 507-508.
J. A. Ewen (1984) J. Am. Chem. Soc. 106, 6355-6364.

*Primary Examiner*—Joseph L. Schofer
*Assistant Examiner*—Mark Nagumo
*Attorney, Agent, or Firm*—Burns, Doane, Swecker & Mathis

[57] ABSTRACT

An α-olefin-alkenylsilane copolymer having steric regularity in which the side chains in the α-olefin unit substantially have the steric regularity, the content of alkenylsilane units is from 0.01 to 50% by weight, and the intrinsic viscosity measured in a tetralin solution at 135° C. is 0.01 or higher. A method for preparing the above copolymer comprises the step of copolymerizing an α-olefin having 3 to 25 carbon atoms with an alkenylsilane in the presence of a catalyst comprising an aluminoxane and a transition metal compound containing a cyclopentadiene group or its derivative as a ligand.

6 Claims, No Drawings

※ α-OLEFIN-ALKENYLSILANE COPOLYMER AND METHOD FOR PREPARING SAME

This application is a continuation of application Ser. No. 07/616,933 filed Nov. 21, 1990, now abandoned, the contents of which are hereby incorporated by reference.

BACKGROUND OF THE INVENTION (i) Field of the Invention

The present invention relates to a copolymer having steric regularity of an α-olefin and an alkenylsilane, and a method for preparing the same.

(ii) Description of the Related Art

A copolymer of an alkenylsilane and an α-olefin is expected to have certain physical properties in view of the copolymer itself and to have various functions which can be obtained by the utilization of the reactivity of alkenylsilane units in the copolymer. However, when the α-olefin is copolymerized with an alkenylsilane or a halogenated alkenylsilane by the use of a conventional catalyst, the alkenylsilane can scarcely be introduced into the resulting copolymer. Even if the alkenylsilane is used in large quantities, a copolymer containing only a small amount of alkenylsilane units is obtained.

Therefore, it is now desired to acquire a copolymer containing an effective amount of alkenylsilane units and to develop a method for preparing the same in a high yield per unit amount of a catalyst.

SUMMARY OF THE INVENTION

The present inventors have intensively conducted research to obtain a copolymer of an α-olefin and an alkenylsilane having steric regularity by which the above-mentioned problem is solved, and as a result, they have found a method for preparing the above-mentioned kind of copolymer by the use of a high-activity catalyst.

That is, the present invention is directed to an α-olefin-alkenylsilane copolymer having steric regularity in which the side chains in the α-olefin unit substantially have steric regularity, the content of alkenylsilane units is from 0.01 to 50% by weight, and its intrinsic viscosity measured in a tetralin solution at 135° C. is 0.01 dl/g or higher. Furthermore, the present invention is also directed to a suitable method for preparing the above-mentioned copolymer, i.e., a method for preparing an α-olefin-alkenylsilane copolymer having steric regularity which comprises the step of copolymerizing an α-olefin having 3 to 25 carbon atoms with an alkenylsilane in the presence of a catalyst comprising an aluminoxane and a transition metal compound containing cyclopentadiene or its derivative as a ligand.

In the copolymer of the present invention, "the side chains in the α-olefin unit substantially has steric regularity" means that the side chains has a substantially isotactic or syndiotactic structure. Here, "a substantially isotactic structure" has the following meaning: Even in the copolymer, the side chains in the α-olefin unit have an isotactic structure, and according to a $^{13}$C-NMR spectrum obtained by measuring the copolymer in a 1,2,4-trichlorobenzene solution, absorption is observed, even in the copolymer, at the position of the peak attributed to the isotactic structure of the methyl or methylene groups of the side chains directly bonded to the main chain which can be observed when the α-olefin alone is polymerized. For example, in the case where the α-olefin is propylene, the peak is observed at about 21.7 ppm, and it is necessary that the ratio of the peak intensity of this peak to the total intensity of all the peaks attributed to the methyl groups of the propylene units is 0.3 or more.

On the other hand, "a substantially syndiotactic structure" means that even in the copolymer, the side chains in the α-olefin unit have a syndiotactic structure and that in a $^{13}$C-NMR spectrum which can be obtained by measuring the copolymer in a 1,2,4-trichlorobenzene solution, a peak not attributed to the isotactic structure is observed as substantially one peak on a higher magnetic field side than a peak attributed to the isotactic structure and the ratio of the peak intensity of the observed peak to the total intensity of all the peaks attributed to methyl or methylene groups directly bonded to the main chain is 0.3 or more. In the case where the copolymer is composed of the α-olefin mainly comprising propylene and the alkenylsilane, the above-mentioned definition corresponds to that in the $^{13}$C-NMR spectrum, the ratio of the peak intensity of a peak observed at about 20.2 ppm to the total intensity of all the peaks attributed to the methyl groups of the propylene units is 0.3 or more.

The copolymer of the present invention is excellent in stiffness despite the general type of copolymer, and it also has excellent transparency and good heat resistance. Furthermore, this copolymer is useful as a resin for injection molding and extrusion. Since alkenylsilane units are introduced into the copolymer, some functions can be obtained, and thus, it is fair to say that the copolymer of the present invention is industrially very valuable.

DESCRIPTION OF THE PREFERRED EMBODIMENTS

A copolymer of the present invention will be clear from the following description of a method for preparing the copolymer.

In the preparation of an α-olefin-alkenylsilane copolymer of the present invention, many known catalysts can be used in the presence of which α-olefin polymers having steric regularity can be manufactured. Examples of suitable catalysts include these that are enumerated in W. Kaminskyra et al., Polymer Bulletin, Vol. 9, p. 464–469 (1987); Angew. Chem. Vol. 24, p. 507 (1985); and J. A. Ewen et al., J. Am. Chem., Vol. 106, p. 6355 (1984) and Vol. 110, p. 6255 (1988), and catalysts comprising transition metals and aluminoxanes which are disclosed in many patents.

In particular, the utilizable transition metal compound is an organic metal compound of zirconium or hafnium containing cyclopentadiene or its derivative as a ligand. In particular, it is known that a transition metal compound containing an ethylenebisindenyl group or its hydrogenated counterpart as the ligand, or a compound containing an symmetrical ligand formed by combining two indenyl groups, their hydrogenated counterparts or two alkyl group-substituted cyclopentadiene groups mutually with the aid of silicon and an aluminoxane can offer isotactic polyolefins, and a compound containing an asymmetrical ligand formed by combining a fluorenyl group and a cyclopentadienyl group mutually with the aid of a methyl group and an aluminoxane can offer syndiotactic polyolefins. When the α-olefin is copolymerized with the alkenylsilane in the presence of the above-mentioned catalyst, the resulting copolymer can possess the steric regularity. More specifically, examples of the transition metal compound having the symmetrical ligand include bisalkylsilylenecyclopentadienylzirconium dichlorides, these dichlorides in which the cyclopentadienyl group is substituted, ethylenebisindenylzirconium dichlorides and their hydrides. Examples of the transition metal compound having the asymmetric ligand include isopropyl(cyclopentadienyl-1-fluorenyl)hafnium dichloride and isopropyl(cyclopentadienyl-1-fluorenyl)zirconium dichloride. In addition, other compounds which are different from the above-mentioned compounds in the structure can also be used, as long as they are a metallocene compound and can provide a polypropylene having an isotactic pentad fraction of 0.7 or more [A. Zambelli et al., Macromolecules, Vol. 6, p. 687 (1973) and the same, Vol. 8, p. 925 (1975)] or a syndiotactic pentad fraction of 0.7 or more when propylene is homopolymerized.

Examples of the aluminoxane which is used together with the above-mentioned transition metal compound include compounds represented by the general formula

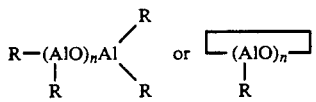

(wherein R is a hydrocarbon residue having 1 to 3 carbon atoms). In particular, what is suitably used is the aluminoxane in which R is a methyl group and n is 5 or more, preferably from 10 to 100. The amount of the aluminoxane to be used is from 10 to 1,000,000 mole times, usually from 50 to 5,000 mole times as much as that of the transition metal compound. No particular restriction is put on polymerization conditions, and various polymerization techniques are utilizable such as solvent polymerization using an inert solvent, bulk polymerization in which there is substantially no inert solvent, and gas phase polymerization.

The alkenylsilane used in the present invention can be represented by the general formula

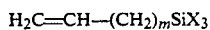

(wherein X is a hydrogen atom, a halogen atom or a saturated hydrocarbon residue having 1 to 20 carbon atoms, and m is an integer of from 0 to 10).

Typical examples of the alkenylsilane include vinylsilane, allylsilane, butenylsilane, pentenylsilane, hexenylsilane and those compounds in which the hydrogen atom of the Si-H bond is substituted by a halogen atom or a saturated hydrocarbon residue having 1 to 20 carbon atoms.

Furthermore, examples of the α-olefin include α-olefins having 3 to 25 carbon atoms and compounds having the general formula $H_2C=CH-(CH_2)_l-CH_3$ and a formula in which the moiety of $-(CH_2)_l-CH_3$ of this general formula has a branched structure. Typical examples of the α-olefin include straight-chain α-olefins such as propylene, butene-1, pentene-1, hexene-1, heptene-1, octene-1, nonene-1, decene-1, undecene-1, dodecene-1, tridecene-1, pentadecene-1, hexadecene-1, heptadecene-1 and octadecene-1, and branched α-olefins such as 3-methylbutene-1, 4-methylpentene-1 and 4,4-dimethylpentene-1. One or more of these α-olefins may be used in the polymerization. In this connection, ethylene may also be used in an amount of 10% or less of the α-olefin.

Usually, polymerization temperature is in the range of from $-100°$ to $200°$ C. and polymerization pressure is in the range of from atmospheric pressure to 100 kg/cm$^2$-G. Preferably the polymerization temperature is in the range of from $-100°$ to $100°$ C. and the polymerization pressure is in the range of from atmospheric pressure to 50 kg/cm$^2$-G.

In the present invention, it is important that the amount of monomers introduced into the polymerization system be controlled so that the ratio of the above-mentioned alkenylsilane units with respect to the whole polymer may be from 0.01 to 50% by weight, and that the polymerization be carried out under conditions for meeting the requirement that the side chains in the α-olefin unit in the copolymer has a substantially isotactic or syndiotactic structure. The latter requirement can be met basically by employing conditions under which the homopolymerization of the α-olefin can be effected in order to obtain a polymer where its tacticity is substantially isotactic or syndiotactic. The polymerization conditions which are required in the present invention can be achieved by suitably selecting the above-mentioned polymerization catalyst.

When the amount of the alkenylsilane units is 0.01% by weight or less, the effect based on the presence of the alkenylsilane in the polymerization cannot be exerted, and when it is 50% by weight or more, physical properties of the isotactic or syndiotactic poly-α-olefin cannot be obtained. Thus, the preferable amount of the alkenylsilane units is from about 0.05 to about 40% by weight. Furthermore, the molecular weight of the polymer is suitably such that its intrinsic viscosity measured in a tetralin solution at 135° C. is 0.01 dl/g or higher so as to assure characteristics of the polymer and is from about 0.1 dl/g to about 10 dl/g in view of moldability. In order that the obtained copolymer may be crystalline which is a copolymer of the α-olefin mainly comprising propylene and the alkenylsilane and in which the side chains in the α-olefin unit has the syndiotactic structure, it is preferred that among peaks attributed to methyl groups in the propylene units measured by $^{13}$C-NMR, the intensity of the peak observed at about 20.2 ppm occupies 0.3 or more of the peak intensity of all the methyl groups in the propylene units.

In the case of the syndiotactic copolymer of the present invention wherein the α-olefin is butene-1, in the $^{13}$C-NMR spectrum observed in a 1,2,4-trichlorobenzene, among the peaks attributable to the side chain methylene groups directly bonded to the main chain and observed in the range of about 26 to 28 ppm, a main peak attributed to syndiotactic pentads observed at about 26.9 ppm has an intensity of 0.3 or more relative to the sum of the intensities of the total peaks.

In the case where the α-olefins are pentane-1 and hexadecene, the ranges are about 37 to 39 ppm and about 35 to 37 ppm and the main peak positions are about 37.5 ppm and about 35.7 ppm, respectively.

Now, the present invention will be described in more detail in reference to examples. However, the invention is not to be construed as being limited to the particular embodiments disclosed.

EXAMPLE 1

In 100 ml of toluene in a 300-ml autoclave were dissolved 10 mg of ethylenebis(4,5,6,7-tetrahydroindenyl)-zirconium dichloride and 1.36 g of methylaluminoxane having a polymerization degree of 16 made by Toso Akuzo Co., Ltd. The ethylenebis(4,5,6,7-tetrahydroindenyl)zirconium dichloride was obtained by introducing lithium into ethylenebisindene synthesized in an ordinary manner, reacting with zirconium tetrachloride, and then hydrogenating. Afterward, 7.2 g of trimethylallylsilane was added to the solution, and polymerization was then carried out at 32° C. for 7 hours, while propylene was introduced thereinto so that the pressure in the autoclave might be 1 kg/cm$^2$-G. After the polymerization, the unreacted monomers were purged, and the resulting slurry was then added to 300 ml of methanol, followed by stirring and filtering, in order to obtain a powder. The powder was washed with 1 liter of methanol 4 times, and then dried at 80° C. under reduced pressure, so that 74 g of the polymer was produced. According to analysis, the content of silicon was 1.9% by weight and that of trimethylallysilane units was 7.7% by weight. Furthermore, according to $^{13}$C-NMR, the absorption by the methyl group of propylene was observed at about 21.7 ppm, and the ratio of the peak intensity of this peak to the total intensity of the peaks attributed to the methyl groups of all the propylene units was about 0.36, which meant that the side chains in the propylene unit had a substantially isotactic structure. In addition, when measured in a tetralin solution at 135° C., the intrinsic viscosity (hereinafter referred to simply as "$\eta$") of the polymer was 0.15 dl/g.

EXAMPLE 2

Polymerization and after-treatment were conducted by the same procedure as in Example 1 except that trimethylallylsilane was replaced with trimethylvinylsilane, in order to obtain 37 g of a polymer. In the thus obtained polymer, the content of trimethylvinylsilane units was 8.1% by weight, and "$\eta$" was 0.21 dl/g.

Furthermore, according to $^{13}$C-NMR, the absorption by the methyl group of propylene was observed at about 21.7 ppm, and the ratio of the peak intensity of this peak to the total intensity of the peaks attributed to the methyl groups of all the propylene units was 0.32, which meant that the side chains in the propylene unit in this polymer had a substantially isotactic structure.

COMPARATIVE EXAMPLE 1

As catalysts, 20 g of magnesium chloride, 5.5 g of di-n-butyl phthalate and 9 g of titanium tetrachloride were ground together, and were then treated with boiling toluene in order to obtain a catalyst component. Afterward, propylene was polymerized with trimethylvinylsilane in the same manner as in Example 2 in the presence of a catalyst comprising 100 mg of the above-mentioned catalyst component, 0.20 ml of triethylaluminum and 0.10 ml of dimethoxydiphenylsilane. As a result, 1.3 g of a polymer was obtained, but it contained no detectable amount of trimethylvinylsilane units (lower than 0.001 weight percent).

EXAMPLE 3

Polymerization and after-treatment were conducted by the same procedure as in Example 1 except that trimethylallylsilane was replaced with dimethylvinylsilane, in order to obtain 41 g of a polymer. In this polymer, the content of dimethylvinylsilane units was 6.5% by weight, and "$\eta$" was 0.16 dl/g.

Furthermore, according to $^{13}$C-NMR, the absorption by the methyl group of propylene was observed at about 21.7 ppm, and the ratio of the peak intensity of this peak to the total intensity of the peaks attributed to the methyl groups of all the propylene units was 0.38, which meant that the side chains in the propylene unit in this polymer had a substantially isotactic structure.

EXAMPLE 4

Polymerization and after-treatment were conducted by the same procedure as in Example 1 except that propylene was replaced with butene-1, in order to obtain 16 g of a polymer. The content of trimethylallylsilane units was 15.5% by weight, and "$\eta$" was 0.28 dl/g. Furthermore, according to the measurement by $^{13}$C-NMR, the ratio of the peak intensity of the peak at about 28.0 ppm attributed to the methylene group of the side chains to the total intensity of the peaks (observed at about 26 to 28.5 ppm) attributed to the methylene groups of all the side chains was about 0.6, which meant that the side chains in the butene-1 unit in this polymer had a substantially isotactic structure.

EXAMPLE 5

In 100 ml of toluene in a 300-ml autoclave were dissolved 10 mg of isopropyl(cyclopentadienyl-1-fluorenyl)zirconium dichloride and 1.36 g of methylaluminoxane having a polymerization degree of 16 made by Toso Akuzo Co., Ltd. The isopropyl(cyclopentadienyl-1-fluorenyl)zirconium dichloride was obtained by introducing lithium into isopropylcyclopentadienyl-1-fluorene synthesized in a conventional manner, reacting the same with zirconium tetrachloride, and then purifying the resultant reaction product. Afterward, 7.2 g of trimethylallylsilane was added to the solution. Propylene was introduced thereinto until a pressure of 1 kg/cm$^2$-G had been reached and while propylene was additionally fed thereto so that the pressure might be constant, polymerization was carried out at 20° C. for 7 hours. After the polymerization, the unreacted monomers were purged, and the resulting slurry was added to 300 ml of methanol, followed by stirring and filtering, in order to obtain a powder. The powder was washed with 1 liter of methanol 4 times, and then dried at 80° C. under reduced pressure, thereby producing 57 g of a polymer. According to elemental analysis, the content of trimethylallysilane units was 14.7% by weight. Furthermore, according to $^{13}$C-NMR analysis, the ratio of the peak intensity of the methyl groups of the propylene units observed at about 20.2 ppm to the total intensity of the peaks attributed to all the methyl groups of the propylene units was 0.52, which meant that the side chains in the propylene unit had a substantially syndiotactic structure. In addition, "$\eta$" was 0.23 dl/g, and when measured in a 1,2,4-trichlorobenzene solution at 135° C. a ratio of the weight average molecular weight to the number average molecular weight (hereinafter referred to as "MW/MN") of the polymer was 2.2.

A pressed sheet having a thickness of 1 mm was prepared from this copolymer, and the tensile yield strength [ASTM D638 (23° C.)] and the haze (ASTM D1003) were measured as 245 kg/cm$^2$ and 35%, respectively.

In accordance with the same procedures as above, a homopolymer of propylene alone was prepared. The tensile yield strength and the haze were measured on a similarly pressed sheet obtained from the homopolymer, and determined to be 224 kg/cm2 and 68%, respectively.

EXAMPLE 6

Polymerization and after-treatment were conducted by the same procedure as in Example 5 except that trimethylallylsilane was replaced with trimethylvinylsilane, in order to obtain 24 g of a copolymer. In the thus obtained copolymer, the content of trimethylvinylsilane units was 9.5% by weight, and "η" was 0.30 dl/g and MW/MN was 2.3. Furthermore according to the measurement by $^{13}$C-NMR, the ratio of the peak intensity of the methyl groups of the propylene units observed at about 20.2 ppm to the total intensity of the peaks attributed to all the methyl groups of the propylene units was 0.61, which meant that the side chains in the propylene unit had a substantially syndiotactic structure.

EXAMPLE 7

Polymerization and after-treatment were conducted by the same procedure as in Example 5 except that trimethylallylsilane was replaced with dimethylvinylsilane, in order to obtain 12 g of a copolymer. This copolymer included 7.9% by weight of dimethylvinylsilane units, and its "η" was 0.18 dl/g and MW/MN was 2.1. Furthermore, according to the measurement by $^{13}$C-NMR, the ratio of the peak intensity of the methyl groups of the propylene units observed at about 20.2 ppm to the total intensity of the peaks attributed to all the methyl groups of the propylene units was 0.65, which meant that the side chains in the propylene unit had a substantially syndiotactic structure.

EXAMPLE 8

To a mixture of 100 g of butene-1 and 20 g of trimethylallylsilane in a 300-ml autoclave were added 10 mg of isopropyl(cyclopentadienyl-1-fluorenyl)zirconium dichloride obtained in Example 5 and 1.36 g of methylaluminoxane having a polymerization degree of 16 made by Toso Akuzo Co., Ltd, and polymerization was then carried out at 30° C. for 5 hours. After the polymerization, the unreacted butene-1 was purged, and the resulting slurry was added to 300 ml of methanol, followed by stirring and filtering, in order to obtain a powder. The powder was washed with 1 liter of methanol 4 times, and then dried at 80° C. under reduced pressure, thereby producing 28 g of a polymer. According to elemental analysis, the content of trimethylallylsilane units was 17.5% by weight. Furthermore, according to $^{13}$C-NMR analysis, the ratio of the peak intensity of the methylene groups of the side chains of the butene-1 units observed at about 26.9 ppm to the total intensity of the peaks (observed at about 26 to 28 ppm) attributed to all the methylene groups of the side chains of the butene-1 units was 0.62, which meant that the side chains in the butene-1 unit had a substantially syndiotactic structure. In addition, the "η" of the polymer was 0.39 dl/g and the "MW/MN" thereof was 1.8.

EXAMPLE 9

Polymerization and after-treatment were conducted by the same procedure as in Example 8 except that trimethylallylsilane was replaced with trimethylvinylsilane, in order to obtain 18 g of a copolymer. This copolymer included 11.5% by weight of trimethylvinylsilane units, and its "η" was 0.28 dl/g and MW/MN was 1.9. Furthermore, according to the measurement by $^{13}$C-NMR, the ratio of the peak intensity of the methylene groups of the side chains of the butene-1 units observed at about 26.9 ppm to the total intensity of the peaks (observed at about 26 to 28 ppm) attributed to all the methylene groups of the side chains of the butene-1 units was 0.58, which meant that the side chains in the butene-1 unit had a substantially syndiotactic structure.

EXAMPLE 10

Polymerization and after-treatment were conducted by the same procedure as in Example 8 except that butene-1 was replaced with pentene-1, in order to obtain 42 g of a copolymer. According to elemental analysis, the content of trimethylallylsilane units was 25.4% by weight, and when measured by $^{13}$C-NMR, the ratio of the peak intensity observed at about 37.5 ppm of the methylene groups of the side chains directly bonded to the main chain of the pentene-1 units to the total intensity of the peaks (observed at about 37 to 39 ppm) attributed to all the methylene groups of the side chains directly bonded to the main chain of the pentene-1 units was 0.55, which meant that the side chains in the pentene-1 unit had a substantially syndiotactic structure. The "η" of the polymer was 0.40 dl/g and the "MW/MN" thereof was 2.0.

EXAMPLE 11

Polymerization and after-treatment were conducted by the same procedure as in Example 8 except that trimethylallylsilane was replaced with dimethylallylsilane and butene-1 was replaced with hexadecene-1, in order to obtain 47 g of a copolymer. According to elemental analysis, the content of dimethylallysilane units was 17.5% by weight, and when measured by $^{13}$C-NMR, the ratio of the peak intensity observed at about 35.1 ppm of the methylene groups of the side chains directly bonded to the main chain of the hexadecene-1 units to the total intensity of the peaks (observed at about 35 to 36 ppm) attributed to all the methylene groups of the side chains directly bonded to the main chain of the hexadecene-1 units was 0.45, which meant that the side chains in the hexadecene-1 unit had a substantially syndiotactic structure. The "η" of the polymer was 0.12 dl/g and the "MW/MN" was 2.1.

What is claimed is:

1. A syndiotactic α-olefin-alkenylsilane copolymer in which among peaks attributable to the side chain methyl or methylene groups directly bonded to the main chain of the copolymer and indicative of isotactic, syndiotactic and atactic configurations of the copolymer the alkyl groups in the side chains of the α-olefin units have a substantially syndiotactic configuration so that, in the $^{13}$C-NMR spectrum of the copolymer observed in a 1,2,4-trichlorobenzene solution, (i) a main peak not attributable to the isotactic structure thereof is positioned on the side of higher magnetic field than is the peak attributable to the isotactic structure, and (ii) the intensity of said main peak is 0.3 or more relative to the sum of the intensities of the total peaks attributable to the side chain methyl or methylene groups directly bonded to the main chain; the alkenylsilane is represented by the formula;

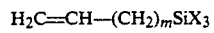

$$H_2C=CH-(CH_2)_mSiX_3$$

wherein X is a hydrogen atom, a halogen atom or a saturated hydrocarbon residue having from 1 to 20 carbon atoms, and m is an integer of from 0 to 10; the content of alkenylsilane units is from 3 to 35% by mol;

and an intrinsic viscosity measured in a tetralin solution at 135° C. is at least 0.01 dl/g.

2. The syndiotactic α-olefin-alkenylsilane copolymer as claimed in claim 1, wherein the α-olefin is propylene and the main peak in the $^{13}$C-NMR spectrum is observed at about 20.2 ppm.

3. The syndiotactic α-olefin-alkenylsilane copolymer as claimed in claim 1, wherein the α-olefin is butene-1 and the main peak in the $^{13}$C-NMR spectrum is observed at about 26.9 ppm.

4. The syndiotactic α-olefin-alkenylsilane copolymer as claimed in claim 1, wherein the α-olefin is pentene-1 and the main peak in the $^{13}$C-NMR spectrum is observed at about 37.5 ppm.

5. The syndiotactic α-olefin-alkenylsilane copolymer as claimed in claim 1, wherein the α-olefin is hexadecene-1 and the main peak in the $^{13}$C-NMR spectrum is observed at about 35.1 ppm.

6. A method for preparing a syndiotactic copolymer consisting of 65–97% by mol of an α-olefin and 3–35% by mol of an alkenylsilane which is represented by the formula:

$$H_2C=CH-(CH_2)_mSiX_3$$

wherein X is a hydrogen atom, a halogen atom or a saturated hydrocarbon residue having from 1 to 20 carbon atoms, and m is an integer of from 0 to 10, comprising the steps of copolymerizing the α-olefin with the alkenylsilane in the presence of a soluble catalyst comprising an aluminoxane and a transition metal compound having two asymmetrical ligands combined mutually which are selected from the group consisting of cyclopentadiene groups and derivatives thereof.

* * * * *